US010904167B2

(12) United States Patent
Tsirkin (10) Patent No.: US 10,904,167 B2
(45) Date of Patent: Jan. 26, 2021

(54) INCOMING PACKET PROCESSING FOR A COMPUTER SYSTEM

(71) Applicant: Red Hat, Inc., Raleigh, NC (US)

(72) Inventor: Michael Tsirkin, Westford, MA (US)

(73) Assignee: Red Hat, Inc., Raleigh, NC (US)

(*) Notice: Subject to any disclaimer, the term of this patent is extended or adjusted under 35 U.S.C. 154(b) by 0 days.

(21) Appl. No.: 16/395,064

(22) Filed: Apr. 25, 2019

(65) Prior Publication Data

US 2020/0344182 A1 Oct. 29, 2020

(51) Int. Cl.
*H04L 12/861* (2013.01)
*G06F 9/455* (2018.01)
*H04L 12/863* (2013.01)

(52) U.S. Cl.
CPC ...... *H04L 49/9068* (2013.01); *G06F 9/45558* (2013.01); *H04L 47/6295* (2013.01); *G06F 2009/45595* (2013.01)

(58) Field of Classification Search
CPC ............. G06F 9/45533; G06F 9/45558; G06F 2009/4557; G06F 2009/45562
See application file for complete search history.

(56) References Cited

U.S. PATENT DOCUMENTS

| | | | |
|---|---|---|---|
| 8,102,881 B1 * | 1/2012 | Vincent | H04L 69/12 370/474 |
| 9,742,682 B2 | 8/2017 | Jain et al. | |
| 10,103,972 B2 | 10/2018 | DeCusatis et al. | |
| 10,129,153 B2 | 11/2018 | Caulfield et al. | |
| 2017/0118130 A1 * | 4/2017 | Sreeramoju | H04L 47/11 |
| 2017/0308394 A1 * | 10/2017 | Zheng | G06F 13/24 |
| 2019/0068491 A1 * | 2/2019 | Tsirkin | H04L 41/50 |
| 2020/0036636 A1 * | 1/2020 | Holla | H04L 49/3009 |

OTHER PUBLICATIONS

Paolo Abeni, "Achieving high-performance, low-latency networking with XDP: Part 1", Red Hat Enterprise Linux 8 Beta, Dec. 6, 2018, 12 pages.
Jesper Dangaard Brouer et al., "XDP For the Rest of US", Netdev 2.2, Seoul, South Korea, Nov. 8, 2017, 37 pages.
Dominik Scholz et al., "Performance Implications of Packet Filtering with Linux eBPF", Department of Informatics, Technical University of Munich, 2018 30th International Teletraffic Congress, 9 pages.

* cited by examiner

*Primary Examiner* — Raj Jain
(74) *Attorney, Agent, or Firm* — Lowenstein Sandler LLP (57) ABSTRACT

Aspects of the disclosure provide for mechanisms for processing incoming packets for virtual machines in a computer system. A method of the disclosure includes: processing, by a hypervisor executed on a host machine, a packet to be routed via a virtual machine in view of a packet processing program running on the virtual machine; determining, by the hypervisor, whether the packet is to be passed to a network stack in view of the processing; and in response to determining that the packet is not to be passed to the network stack, placing the packet in a first receive queue of a plurality of receive queues associated with a network interface card associated with the virtual machine, wherein the first receive queue comprises one or more packets to be processed by a packet processing program running on the virtual machine.

19 Claims, 5 Drawing Sheets

RETRIEVE A FIRST PACKET FROM A FIRST RECEIVE QUEUE ASSOCIATED WITH A NETWORK INTERFACE CARD 410

PROCESS THE FIRST PACKET USING A PACKET PROCESSING PROGRAM 420

RETRIEVE A SECOND PACKET FROM A SECOND RECEIVE QUEUE ASSOCIATED WITH THE NETWORK INTERFACE CARD 430

PASS THE SECOND PACKET TO A NETWORK STACK FOR PROCESSING 440

INCOMING PACKET PROCESSING FOR A COMPUTER SYSTEM

TECHNICAL FIELD

The implementations of the disclosure relate generally to computer systems and, more specifically, to processing incoming packets for a computer system, such as a virtualized computer system.

BACKGROUND

Packet processing in a computer system may typically involve networking stack bypassing. XDP or eXpress Data Path may provide a programmable network data path in a Linux kernel. XDP may provide bare metal packet processing. For example, XDP may enable processing of RX (receive) packet-pages directly out of drivers RX ring queue, before any allocations of meta-data structures (e.g., a socket buffer).

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the disclosure provide for mechanisms for processing incoming packets for a computer system, such as a virtualized computer system. Packet processing in a computer system may typically involve networking stack bypassing. For example, a user supplied program (e.g., an eXpress Data Path (XDP) program) may be used to process each incoming packet received by a network interface card. The packet may either bypass a network stack for performance or be passed to the network stack for handling. However, each incoming packet to be processed by the XDP program may have to be copied to a guest memory of the virtual machine, which may compromise the throughput of the computer system. Moreover, bypassing a packet and placing the packet in a network stack may require different sizes of memory for placement of the packet in the guest memory.

Aspects of the disclosure address the above and other deficiencies of the prior solutions by providing mechanisms (e.g., systems, methods, machine-readable media, etc.) for processing incoming packets for a computer system. The mechanisms may process incoming packets received by a network interface card (NIC) by classifying the incoming packets in view of actions to be performed on the incoming packets and maintain multiple receive queues of the incoming packets in view of the classification.

As an example, a hypervisor of the computer system may receive, via a NIC, a packet to be routed via a virtual machine. The hypervisor may determine whether the packet is to be passed to a network stack (e.g., a kernel network stack) for processing. For example, the hypervisor may generate a classifier in view of a packet processing program (e.g., an XDP program) running on the virtual machine. The classifier may include one or more portions of the packet processing program that provide instructions for determining whether an incoming packet is to be passed to the network stack (e.g., whether an "XDP_PASS" action is to be performed on the incoming packet by the packet processing program).

The hypervisor may process the packet using the classifier to determine whether the packet is to be passed to the network stack. In response to determining that the packet is not to be passed to the network stack, the hypervisor may place the packet in a first receive queue associated with the NIC. The first receive queue may include one or more packets to be processed by the packet processing program running on the virtual machine. Alternatively, the hypervisor may place the packet in a second receive queue associated with the NIC in response to determining that the packet is to be passed to the network stack. The second receive queue may include one or more packets to be passed to the network stack for processing.

The virtual machine may process packets in the first receive queue and packets in the second receive queue using different methods. For example, the virtual machine may process the packets in the first receive queue using the packet processing program. As another example, the virtual machine may pass the packets in the second receive queue to a network stack (e.g., a kernel network stack associated with a guest operating system of the virtual machine). In some embodiments, the virtual machine may place the packets from the second receive queue in a kernel data structure (e.g., a socket buffer) associated with the network stack (e.g., by copying the packets into the kernel data structure). As such, the packets from the second receive queue may be passed to the network stack without being processed by the packet processing program and/or being copied to the guest memory.

Accordingly, the mechanisms described herein include technology that enhances networking for a computer system. The technology may enable enhanced packet processing for a computer system by classifying incoming packets using a classifier and maintaining multiple receive queues for a network interface card in view of the classification. By processing packets in the receive queues using different methods, the mechanisms disclosed herein may avoid unnecessary data copies to a guest memory during packet processing for the virtual machine.

Figure 1:
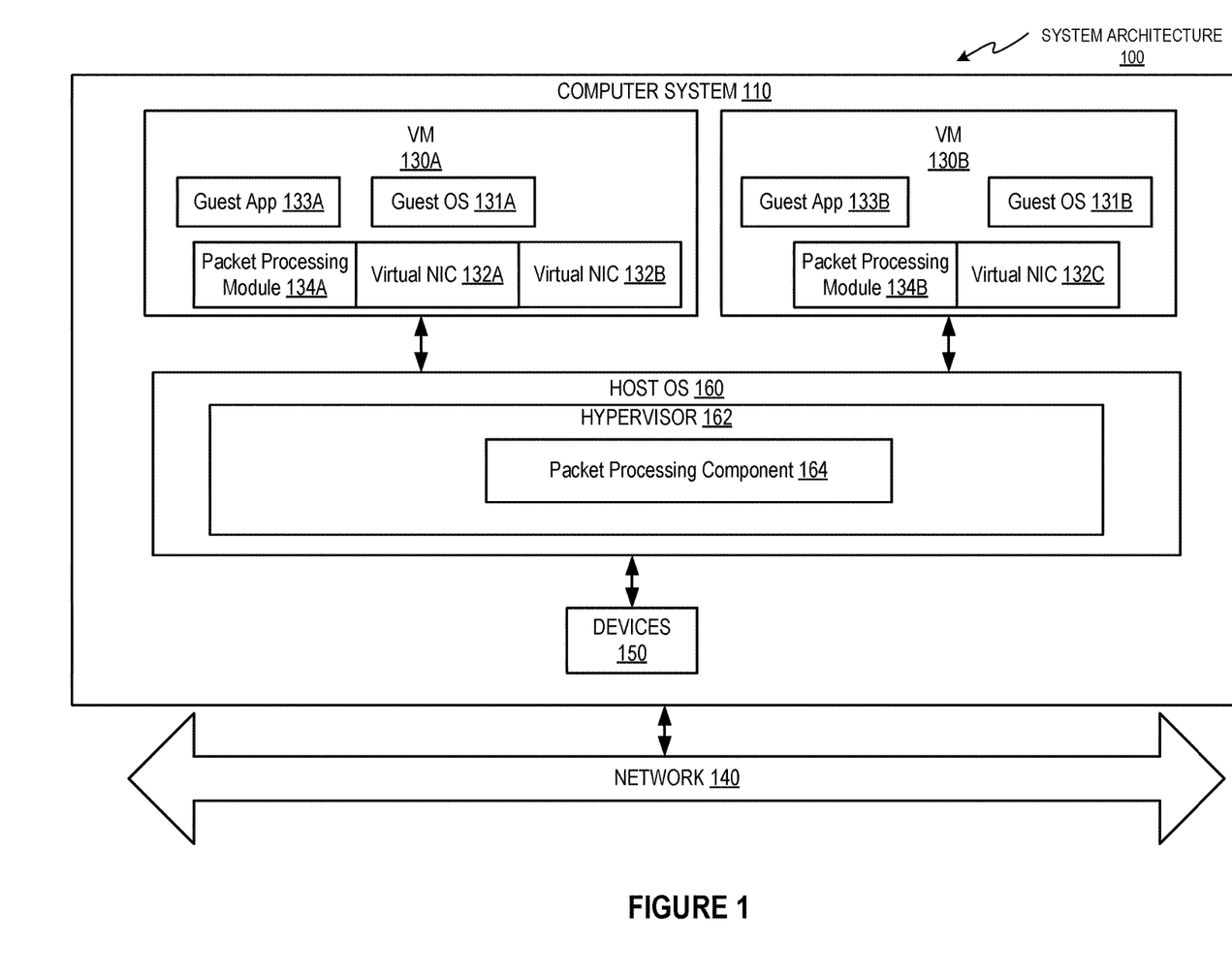
FIG. 1 is a block diagram of a system architecture in which implementations of the disclosure may operate.

FIG. 1 illustrates an example system architecture 100 in which implementations of the disclosure may operate. The system architecture 100 may include a computer system 110 that may be coupled to a network 140. The network 140 may be a public network (e.g., the Internet), a private network (e.g., a virtual local area network (vLAN), a local area network (LAN), or a wide area network (WAN)), or a combination thereof. The network 140 may include a wireless infrastructure, which may be provided by one or more wireless communications systems, such as a wireless fidelity (Wi-Fi) hotspot connected with the network 140 and/or a wireless carrier system that can be implemented using various data processing equipment, communication towers, etc. Additionally or alternatively, the network 140 may include a wired infrastructure (e.g., Ethernet).

The computer system 110 may include one or more processing devices communicatively coupled to memory devices and devices 150 (e.g., I/O devices, CD-ROM drive, physical NICs, etc.). The computer system 110 may be a server, a mainframe, a workstation, a personal computer (PC), a laptop, a mobile device, or any other suitable computing device. The computer system 110 runs a host operating system (OS) 160, which is an application that manages the hardware resources of the computer system 110 and that provides functions such as inter-process communication, scheduling, memory management, and so forth. In an example, the host OS 160 may include and execute a hypervisor 162. The hypervisor 162 may be an application that provides a virtual operating platform for a set of virtual machines 130A and 130B. Although two virtual machines 130A and 130B are depicted, it should be understood that fewer (e.g., 1) or more (e.g., 3, 4, 5, 6, etc.) virtual machines may be included in the computer system 110. The hypervisor 162 may abstract the physical layer of the computer system 110, including the processors, memory, I/O devices, network devices, and presents this abstraction to the virtual machines 130A and 130B. The hypervisor 162 may create, run, manage, and monitor various aspects of virtual machines operation, including the processing, and storage, memory, and network interfaces.

The virtual machines 130A and 130B may be implemented in computer instructions that emulate physical machines and may execute applications as though they were actual physical machines. For example, each virtual machine 130A and 130B may execute a guest operating system 131A and 131B, respectively, that may utilize the underlying virtual devices, including virtual processors, virtual memory, virtual I/O devices, and virtual NICs 132A, 132B, and 132C. Although FIG. 1 depicts the virtual machine 130A as including two virtual NICS 132A and 132B and the virtual machine 130B as including one virtual NIC 132C, it should be understood that there may be multiple virtual NICs included in either or both of the virtual machines 130A and 130B. Further the virtual NICs in the virtual machines 130A and/or 130B may perform the same or different operations within their respective virtual machines. For example, in the virtual machine 130A, the virtual NIC 132A may be used to receive packets and the virtual NIC 132B may be used to transmit packets.

One or more guest applications 133A and 133B may be running on the virtual machines 130A and 130B under the guest operating systems 131A and 131B. The one or more guest applications 133A and 133B may be high-level applications (e.g., user facing applications) or low-level applications (e.g., operating system level applications). In one example, the guest application 133A and 133B may each create a packet processing module 134A and 134B using one or more rules for processing packets. In another example, the packet processing modules 134A and 134B may be created by the guest OSes 131A and 131B. In yet another example, the packet processing modules 134A and 134B may be created by a user and provided to the virtual machines 130A and 130B. The packet processing modules 134A and 134B may each be an express data path (XDP) application. XDP provides a high performance, programmable network data path in the kernel. XDP provides bare metal packet processing at the lowest point in an application stack.

In one example, the guest OSes 131A and 131B may attach the packet processing modules 134A and 134B to the virtual NIC 132A and 132C to be provided to the hypervisor 162. In another example, the guest applications 133A and 133B may attach the packet processing modules 134A and 134B to the virtual NIC 132A and 132C to be provided to the hypervisor 162. In one example, the providing of the packet processing modules 134A and 134B may occur once during setup of the virtual machines 130A and 130B. In another example, an updated packet processing module 134A and 134B may be provided at a time subsequent to setup.

When packets are received by the hypervisor 162, the hypervisor 162 may determine the virtual machine 130A or 130B through which the packets are intended to be routed and select the packet processing module 134A or 134B accordingly. For example, if a packet is intended to be sent to a source node to a destination node through the virtual machine 130A, the hypervisor 162 may identify the packet processing module 134A in the memory and cause execution of the packet processing module 134A to process the packet. Each of the source node and the destination node may be and/or include a virtual machine, a host machine, and/or any other computing device.

As an example, the packet processing component 164 can process packets to be routed via VM 130A. The packet processing component 164 may receive a packet processing program from VM 130A to process the packets. The packet processing program may be and/or include a software program for implementing the packet processing module 134A. In some embodiments, the packet processing program may be an XDP program. The packet processing program may provide one or more instructions for determining an action to be taken by the packet processing program and/or the packet processing module 134A on a packet. For example, the action may include passing the packet to a network stack for processing (e.g., an "XDP_PASS" action). As another example, the action may include instructing a device driver to drop the packet (e.g., an "XDP_DROP" action). As a further example, the action may include bouncing the packet back out the NIC it arrived on (e.g., an "XDP_TX" action).

The packet processing component 164 may generate, in view of the packet processing program, a classifier for classifying packets to be routed via the VM 130A. The classifier may be and/or include a software program and may include one or more portions of the packet processing program that provide instructions for determining whether a packet is to be passed to a network stack for processing (e.g., whether an "XDP_PASS" action is to be performed on the packet). The classifier may process an incoming packet and may classify the incoming packet as a packet that is to be passed to a network stack for processing or a packet that is not to be passed to the network stack. For example, the processing of the packet by the classifier may return a classification result indicating whether an "XDP_PASS" action is to be taken on the incoming packet. In some embodiments, the classification result may include identifying information of an action to be taken on the incoming packet (e.g., "XDP_PASS", an action that is not "XDP_PASS"). In some embodiments, the classification result may include an indication that may provide whether an "XDP_PASS" action is to be taken on the incoming packet (e.g., a Boolean value).

The packet processing component 164 may maintain multiple receive queues for a NIC (e.g., a physical NIC, a virtual NIC) to store incoming packets to be processed using various methods. For example, the packet processing component 164 may associate a plurality of receive queues with the virtual NIC 132A. Each of the receive queues may include one or more packets to be routed via the VM 130A.

The receive queues may be generated in view of classification results provided by the classifier. For example, the packet processing component 164 may generate and/or maintain a first queue of packets that are to be processed by packet processing module 134A. As another example, the packet processing component 164 may generate and/or maintain a second queue of packets that are to be passed to a network stack for processing (e.g., "XDP-PASS" packets).

The VM 130A may process the packets in the first receive queue and the second receive queue using different methods. More particularly, for example, the VM 130A may process the packets in the first receive queue using the packet processing module 134A. The VM 130A may pass the packets in the second receive queue to a network stack (e.g., a kernel network stack associated with the guest OS 131A). For example, the virtual NIC 132A may place the packets from the second receive queue in a kernel data structure (e.g., a socket buffer or skb) associated with the guest OS 131A (e.g., copying the packets into the kernel data structure). The virtual NIC 132A may also notify the guest OS 131A of the placement of the packets into the kernel data structure (e.g., by raising an interrupt).

Figure 2:
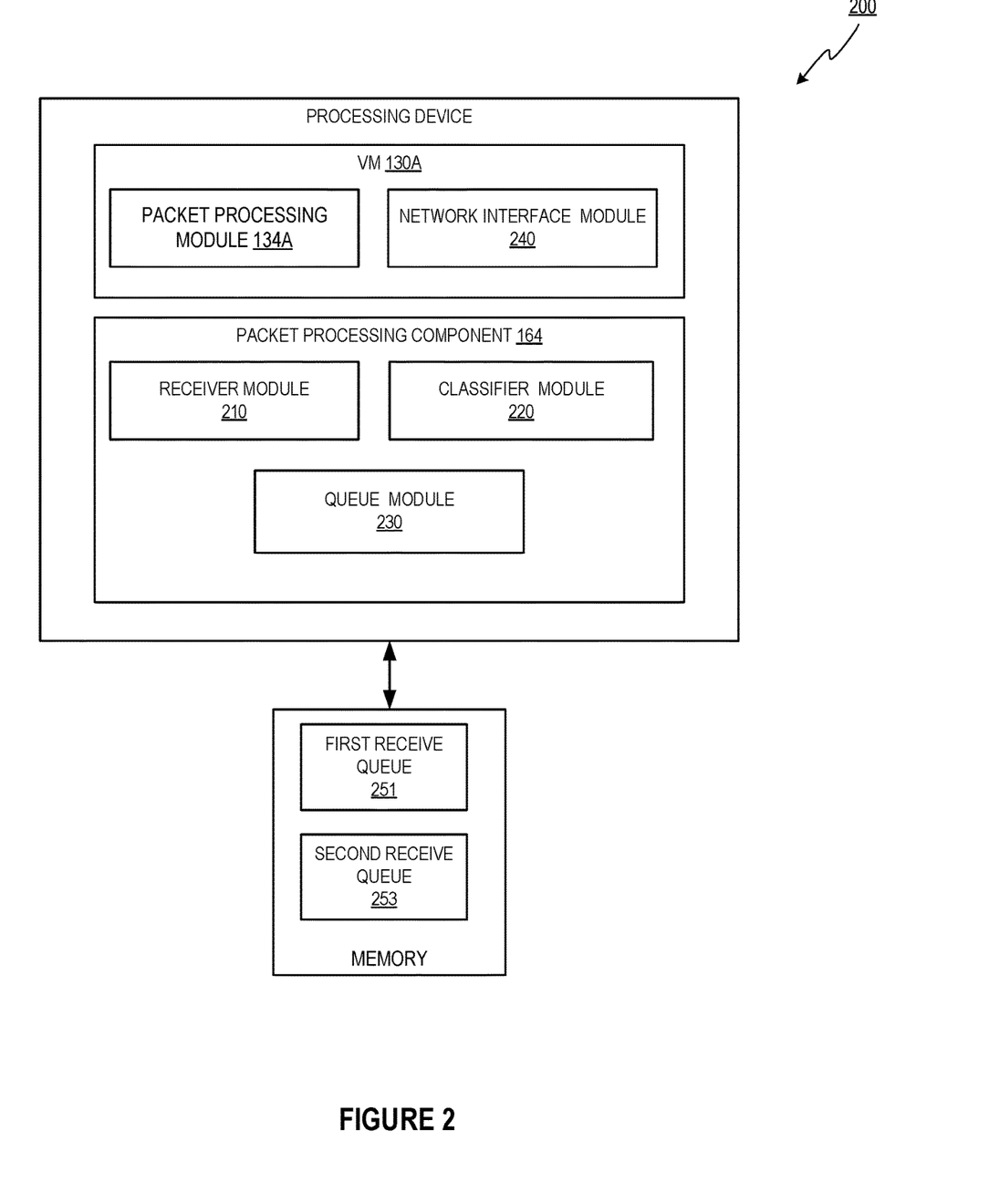
FIG. 2 is a block diagram illustrating a computer system according to an implementation of the disclosure.

FIG. 2 depicts a block diagram illustrating an example computer system 200 in accordance with some implementations of the disclosure. The packet processing component of FIG. 2 may be the same as the packet processing component 164 of FIG. 1. As illustrated, the packet processing component 164 may include a receiver module 210, a classifier module 220, and a queue module 230. The VM 130A may include a packet processing module 134A and a network interface module 240. The packet processing component 164 and/or the VM 130A may be coupled to a memory for storing data to be used to implements various embodiments of the present disclosure (e.g., a first receive queue 251, a second receive queue 253, etc.). More or fewer components may be included without loss of generality. For example, two or more of the components or portions of the components may be combined into a single component, or one of the components may be divided into two or more modules. In one implementation, one or more of the modules may be executed by different processing devices on different computing devices (e.g., different server computers).

The receiver module 210 may receive data to be processed by the packet processing component 164. For example, the receive module 210 may receive packets to be routed via one or more virtual machines. As another example, the receive module 210 may receive computer programs and/or instructions for implementing packet processing modules running on the virtual machines.

The classifier module 220 may generate, in view of the received packet processing program, a classifier for classifying incoming packets for the virtual machine. The classifier may be a computer program and may include one or more portions of the packet processing program that include instructions for determining whether a packet is to be passed to a network stack for processing (e.g., whether an XDP_PASS action is to be taken on the packet).

The classifier module 220 may process incoming packets using the classifier. For example, the classifier module 220 may process a packet to be routed via VM 130A using the classifier. The processing of the packet may produce a classification result indicating whether the packet is to be passed to a network stack for processing (e.g., whether an "XDP_PASS" action is to be taken on the packet). The classifier module 220 may provide the classification result to the queue module 230.

The queue module 230 may receive the classification result and may place the packet in a receive queue associated with the VM 130A in view of the classification result. For example, in response to determining that the packet is not to be passed to the network stack for processing, the queue module 230 may place the packet in a first receive queue of a plurality of receive queues associated with a network interface card associated with the virtual machine. The first receive queue may include one or more packets to be processed by the packet processing program running on the virtual machine. Alternatively, in response to determining that the packet is to be passed to the network stack for processing, the queue module 230 may place the packet in a second receive queue associated with the network interface card. The second receive queue may include one or more packets to be passed to the network stack for processing.

The VM 130A may process the packets in the first receive queue and the second receive queue, respectively. For example, the packet processing module 134A may process the packets in the first receive queue (e.g., by executing the packet processing program using the packets in the first receive queue as input).

As another example, the network interface module 240 may pass the packets in the second receive queue to a network stack (e.g., a kernel network stack associated with a guest OS of VM 130A). For example, the network interface module 240 may place the packets from the second receive queue in a kernel data structure (e.g., a socket buffer) associated with the guest OS 131A (e.g., copying the packets into the kernel data structure). The network interface module 240 may also notify the guest OS 131A of the placement of the packets into the kernel data structure (e.g., by raising an interrupt).

Figure 3:
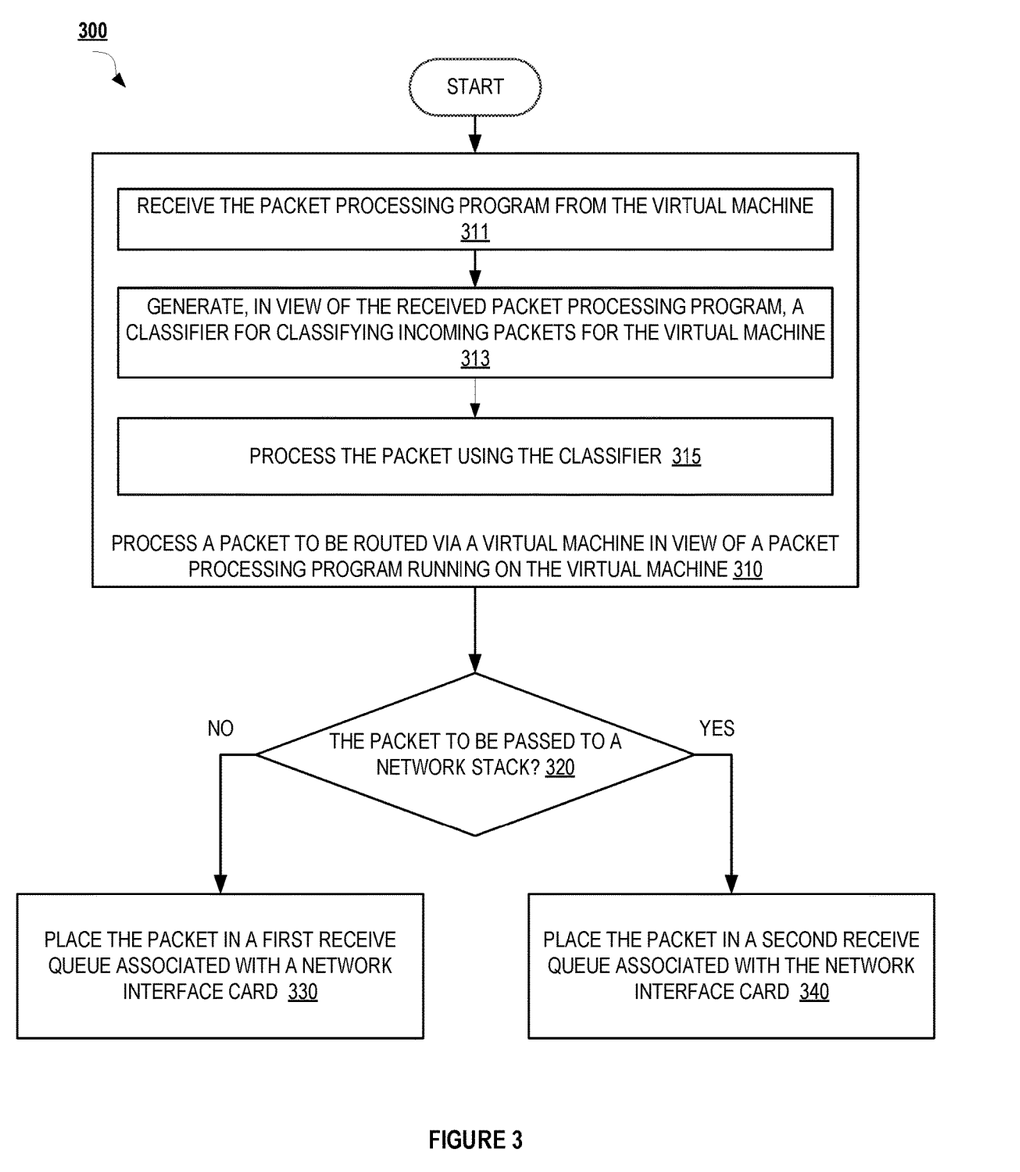
FIG. 3 is a flow diagram illustrating a method for classifying incoming packets for a virtual machine according to an implementation of the disclosure.

FIG. 3 is a flow diagram illustrating a method 300 for classifying incoming packets for a virtual machine in accordance with some embodiments of the disclosure. Method 300 can be performed by processing logic that may comprise hardware (e.g., circuitry, dedicated logic, programmable logic, microcode, etc.), software (such as instructions run on a processing device), firmware, or a combination thereof. In one implementation, method 300 is performed by a hypervisor executing on a processing device (e.g. a processing device 502 of FIG. 5) as described in connection with FIGS. 1 and 2.

Method 300 begins at block 310 where a processing device may process a packet to be routed via a virtual machine in view of a packet processing program running on the virtual machine. The packet processing program may be, for example, an XDP program in some embodiments. To process the packet in view of the packet processing program, the hypervisor may perform operations depicted in blocks 311, 313, and/or 315 in some embodiments.

At block 311, the processing device may receive the packet processing program from the virtual machine. In some embodiments, the processing device may receive the packet processing program at a hypervisor executing on the processing device. At block 313, the processing device may generate, in view of the received packet processing program, a classifier for classifying incoming packets for the virtual machine. The classifier may include one or more portions of the packet processing program (e.g., instructions, routines) that can be used to determine whether an incoming packet is to be passed to a network stack (e.g., a kernel network stack) for processing.

At block 315, the processing device may process the packet using the classifier. For example, the packet may be processed using the classifier to determine whether the packet is to be passed to a network stack for processing (e.g., whether an XDP-PAS S action is to be performed on the packet).

At block 320, the processing device may determine whether the packet is to be passed to a network stack for processing in view of the processing. For example, the processing device may determine that the packet is to be passed to the network stack for processing in response to determining that an XDP-PASS action is to be performed on the packet.

In response to determining that the packet is not to be passed to the network stack for processing, the processing device may proceed to block 330 and may place the packet in a first receive queue associated with a network interface card associated with the virtual machine. The first receive queue may include one or more packets to be processed by the packet processing program running on the virtual machine.

Alternatively, in response to determining that the packet is to be passed to the network stack for processing, the processing device may proceed to block 340 and may place the packet in a second receive queue associated with the network interface card. The second receive queue may include one or more packets to be passed to the network stack for processing.

Figure 4:
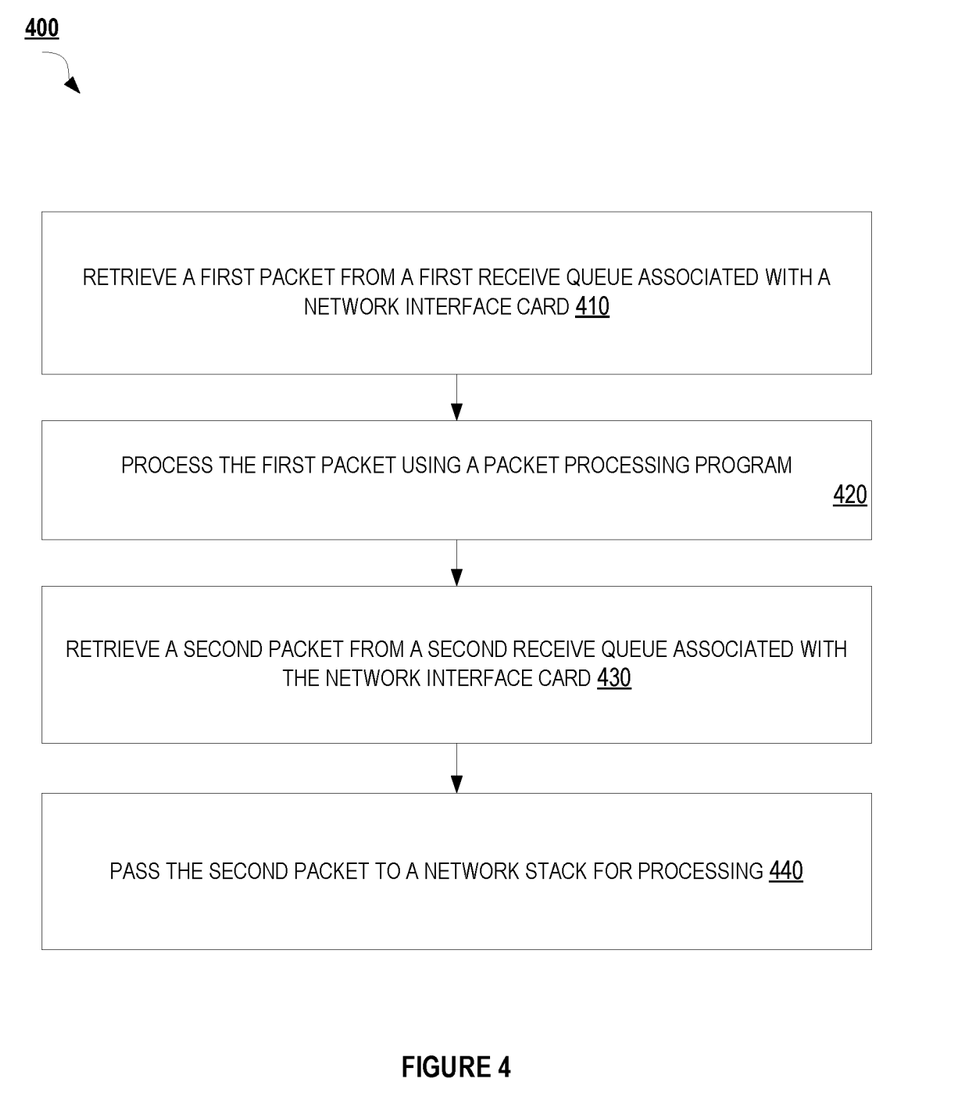
FIG. 4 is a flow diagram illustrating a method for processing classified incoming packets for a virtual machine according to an implementation of the disclosure.

FIG. 4 is a flow diagram illustrating a method 400 for processing incoming packets for a virtual machine in accordance with some embodiments of the disclosure. Method 400 can be performed by processing logic that may comprise hardware (e.g., circuitry, dedicated logic, programmable logic, microcode, etc.), software (such as instructions run on a processing device), firmware, or a combination thereof. In one implementation, method 400 is performed by a virtual machine executing on a processing device (e.g. a processing device 502 of FIG. 5) as described in connection with FIGS. 1 and 2.

At block 410, a processing device may retrieve a packet from a first receive queue associated with a network interface card (also referred to as the "first packet"). The first receive queue may include one or more packets to be processed by the packet processing program running on the virtual machine.

At block 420, the processing device may process the first packet using a packet processing program. For example, the processing device may use the first packet as an input and execute the packet processing program. The packet processing program may be, for example, an XDP program. The execution of the packet processing program may produce a result indicating an action to be performed on the first packet (e.g., XDP_PASS, XDP_DROP, XDP_TX).

At block 430, the processing device may retrieve a packet from a second receive queue associated with the network interface card (also referred to as the "second packet"). The second receive queue may include one or more packets to be passed to a network stack for processing.

At block 440, the processing device may pass the second packet to a network stack for processing. The network stack may be kernel network stack in some embodiments. The processing device may pass the second packet to the network stack by placing the second packet in a kernel data structure (e.g., a socket buffer) associated with the network stack. Placing the second packet into the kernel data structure may involve copying the second packet into the kernel data structure. The processing device may also notify a guest OS of the placement of the second packet into the kernel data structure (e.g., by raising an interrupt).

Figure 5:
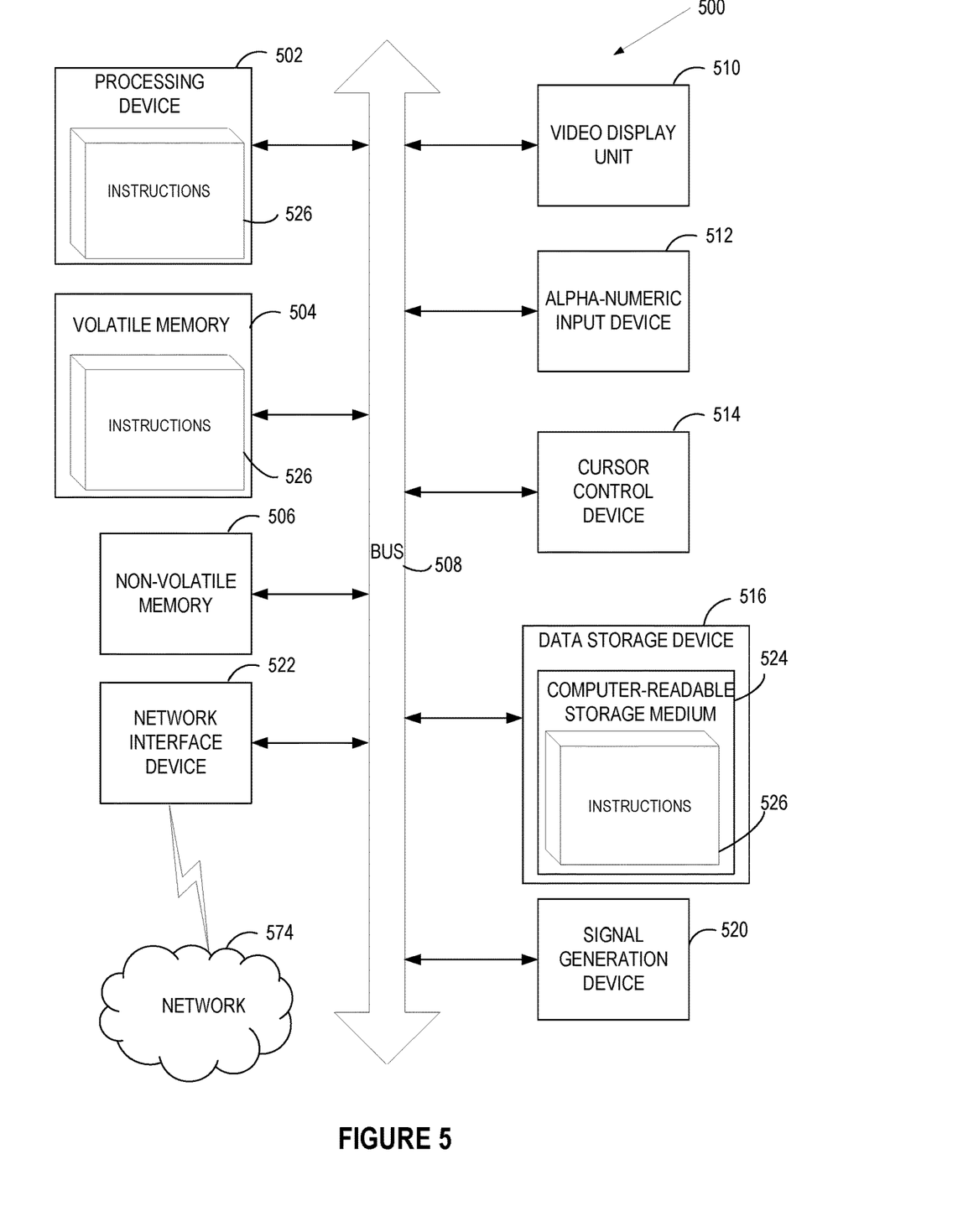
FIG. 5 illustrates a block diagram of one implementation of a computer system.

FIG. 5 depicts a block diagram of a computer system operating in accordance with one or more aspects of the present disclosure. In various illustrative examples, computer system 500 may correspond to a computing system within system architecture 100 of FIG. 1. In one implementation, the computer system 500 may be the computer system 110. The computer system 500 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions implementing method 200 and method 400.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200 and 400, and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
    receiving, by a hypervisor executed on a host machine, a packet processing program from a virtual machine;
    generating, by the hypervisor, a classifier in view of the packet processing program, wherein the classifier includes one or more portions of the packet processing program that validate incoming packets;
    determining, by the hypervisor using the classifier to validate an incoming packet, whether the incoming packet is to be passed to a network stack; and
    in response to determining that the packet is not to be passed to the network stack, placing the packet in a first receive queue of a plurality of receive queues associated with a network interface card associated with the virtual machine, wherein the first receive queue comprises one or more packets to be processed by the packet processing program running on the virtual machine.

2. The method of claim 1, wherein the plurality of receive queues comprises a second receive queue comprising one or more packets to be passed to the network stack for processing.

3. A system comprising:
    a memory; and
    a processing device operatively coupled to the memory, the processing device to:
        receive, by a hypervisor executed on a host machine, a packet processing program from a virtual machine;
        generate, by the hypervisor, a classifier in view of the packet processing program, wherein the classifier includes one or more portions of the packet processing program that validate incoming packets;
        determine, by the hypervisor using the classifier to validate an incoming packet, whether the incoming packet is to be passed to a network stack for processing;
        in response to determining that the packet is not to be passed to the network stack for processing, placing the packet in a first receive queue associated with a network interface card of the virtual machine, wherein the first receive queue comprises one or more packets to be processed using a packet processing program running on the virtual machine; and
        in response to determining that the packet is to be passed to the network stack for processing, placing the packet in a second receive queue associated with the network interface card. queue comprises one or more packets to be passed to the network stack for processing.

4. The method of claim 1, further comprising:
    in response to determining that the incoming packet is to be passed to the network stack, placing the incoming packet in the second receive queue of the plurality of receive queues.

5. The method of claim 1, wherein the network stack comprises a kernel network stack.

6. The method of claim 1, wherein the packet processing program comprises an eXpress Data Path (XDP) program.

7. The method of claim 6, wherein determining whether the incoming packet is to be passed to the network stack comprises determining whether an XDP_PASS action is to be performed on the incoming packet.

8. The method of claim 1, wherein the network interface card comprises a virtual network interface card.

9. The system of claim 3, wherein the second receive queue comprises one or more packets to be passed to the network stack for processing.

10. The system of claim 3, wherein the packet processing program comprises an eXpress Data Path (XDP) program.

11. The system of claim 10, wherein, to determine whether the incoming packet is to be passed to the network stack for processing, the processing device is further to determine whether an XDP_PASS action is to be performed on the incoming packet.

12. The system of claim 3, wherein the network interface card comprises a virtual network interface card.

13. The system of claim 3, wherein the network stack comprises a kernel network stack.

14. A non-transitory machine-readable storage medium including instructions that, when accessed by a processing device, cause the processing device to:
- receive, by a hypervisor executed on a host machine, a packet processing program from a virtual machine;
- generate, by the hypervisor, a classifier in view of the packet processing program, wherein the classifier includes one or more portions of the packet processing program that validate incoming packets;
- determine, by the hypervisor, using the classifier to validate an incoming packet, whether the incoming packet is to be passed to a network stack for processing;
- in response to determining that the packet is not to be passed to the network stack for processing, place the packet in a first receive queue associated with a network interface card of the virtual machine, wherein the first receive queue comprises one or more packets to be processed using a packet processing program running on the virtual machine; and
- in response to determining that the packet is to be passed to the network stack for processing, place the packet in a second receive queue associated with the network interface card.

15. The non-transitory machine-readable storage medium of claim 14, wherein the second receive queue comprises one or more packets to be passed to the network stack for processing.

16. The non-transitory machine-readable storage medium of claim 14, wherein the packet processing program comprises an eXpress Data Path (XDP) program.

17. The non-transitory machine-readable storage medium of claim 14, wherein, to determine whether the incoming packet is to be passed to the network stack for processing, the processing device is further to determine whether an XDP_PASS action is to be performed on the incoming packet.

18. The non-transitory machine-readable storage medium of claim 14, wherein the network interface card comprises a virtual network interface card.

19. The non-transitory machine-readable storage medium of claim 14, wherein the network stack comprises a kernel network stack.

* * * * *

UNITED STATES PATENT AND TRADEMARK OFFICE
CERTIFICATE OF CORRECTION

Page 1 of 1

PATENT NO. : 10,904,167 B2
APPLICATION NO. : 16/395064
DATED : January 26, 2021
INVENTOR(S) : Michael Tsirkin It is certified that error appears in the above-identified patent and that said Letters Patent is hereby corrected as shown below:

In the Claims

In Claim 3, Column 10, Lines 52-54, after "interface card" delete "queue comprises one or more packets to be passed to the network stack for processing"

Signed and Sealed this
Eleventh Day of May, 2021

Drew Hirshfeld
*Performing the Functions and Duties of the
Under Secretary of Commerce for Intellectual Property and
Director of the United States Patent and Trademark Office*